(12) United States Patent
Sogabe (10) Patent No.: US 8,474,559 B2
(45) Date of Patent: Jul. 2, 2013

(54) VEHICLE BODY FRONT PART STRUCTURE

(75) Inventor: Michihiro Sogabe, Shizuoka-Ken (JP)

(73) Assignee: Suzuki Motor Coporation (JP)

( * ) Notice: Subject to any disclaimer, the term of this patent is extended or adjusted under 35 U.S.C. 154(b) by 178 days.

(21) Appl. No.: 13/032,269

(22) Filed: Feb. 22, 2011

(65) Prior Publication Data
US 2011/0210580 A1 Sep. 1, 2011

(30) Foreign Application Priority Data
Feb. 26, 2010 (JP) ................................. 2010-041798

(51) Int. Cl.
*B60R 16/04* (2006.01)
(52) U.S. Cl.
USPC ........................................ 180/68.5; 180/69.1
(58) Field of Classification Search
USPC .................. 180/68.5, 69.1; 429/96, 100, 159
See application file for complete search history.

(56) References Cited

U.S. PATENT DOCUMENTS

| | | | | |
|---|---|---|---|---|
| 5,086,860 A | * | 2/1992 | Francis et al. ............... | 180/68.5 |
| 5,547,036 A | * | 8/1996 | Gawaskar et al. ........... | 180/68.5 |
| 5,636,701 A | * | 6/1997 | Norman et al. .............. | 180/68.5 |
| 6,216,811 B1 | * | 4/2001 | Herc ............................ | 180/68.5 |
| 6,340,538 B1 | * | 1/2002 | King ............................. | 429/96 |
| 6,439,329 B1 | * | 8/2002 | Vaishnav et al. ............. | 180/68.5 |
| 7,469,763 B2 | * | 12/2008 | Dupuis et al. ................ | 180/68.5 |
| 8,196,691 B2 | * | 6/2012 | Moine-Picard et al. ...... | 180/68.5 |
| 2003/0047366 A1 | * | 3/2003 | Andrew et al. .............. | 180/68.5 |
| 2005/0224268 A1 | * | 10/2005 | Dupuis et al. ................ | 180/68.5 |

FOREIGN PATENT DOCUMENTS

| | | |
|---|---|---|
| CN | 201092295 Y | 7/2008 |
| CN | 101357582 A | 2/2009 |
| JP | 11348689 A | 12/1999 |

OTHER PUBLICATIONS

Chinese Office Action 201110045875.X dated May 25, 2012.

* cited by examiner

*Primary Examiner* — Hau Phan
(74) *Attorney, Agent, or Firm* — Lerner, David, Littenberg, Krumholz & Mentlik, LLP (57) ABSTRACT

A vehicle body front part structure has an apron side panel 5 joined to an apron side member 4 extending along the vehicle longitudinal direction, and a tray 14 for battery supported on the apron side member 4. In the front part structure, a leg part 16 is provided in an tray body part 15, a lower end part 16K of the leg part 16 is fixed to the apron side member 4 with a fixing member B, and the leg part 16 is formed of a plate material so that the deformation of the apron side member 4 is allowed when a vehicle longitudinal force is applied to the apron side member 4.

8 Claims, 9 Drawing Sheets

VEHICLE BODY FRONT PART STRUCTURE

CROSS-REFERENCE TO RELATED APPLICATIONS

The present application claims the benefit of Japanese Patent Application No. 2010-041798, filed Feb. 26, 2010. The entire disclosure of the above-identified application is incorporated by reference herein.

FIELD OF THE INVENTION

The present invention relates to a vehicle body front part structure in which an apron side panel is connected to an apron side member extending along the vehicle longitudinal direction, and a tray for a battery is supported at the apron side member.

BACKGROUND OF THE INVENTION

Figure 9:
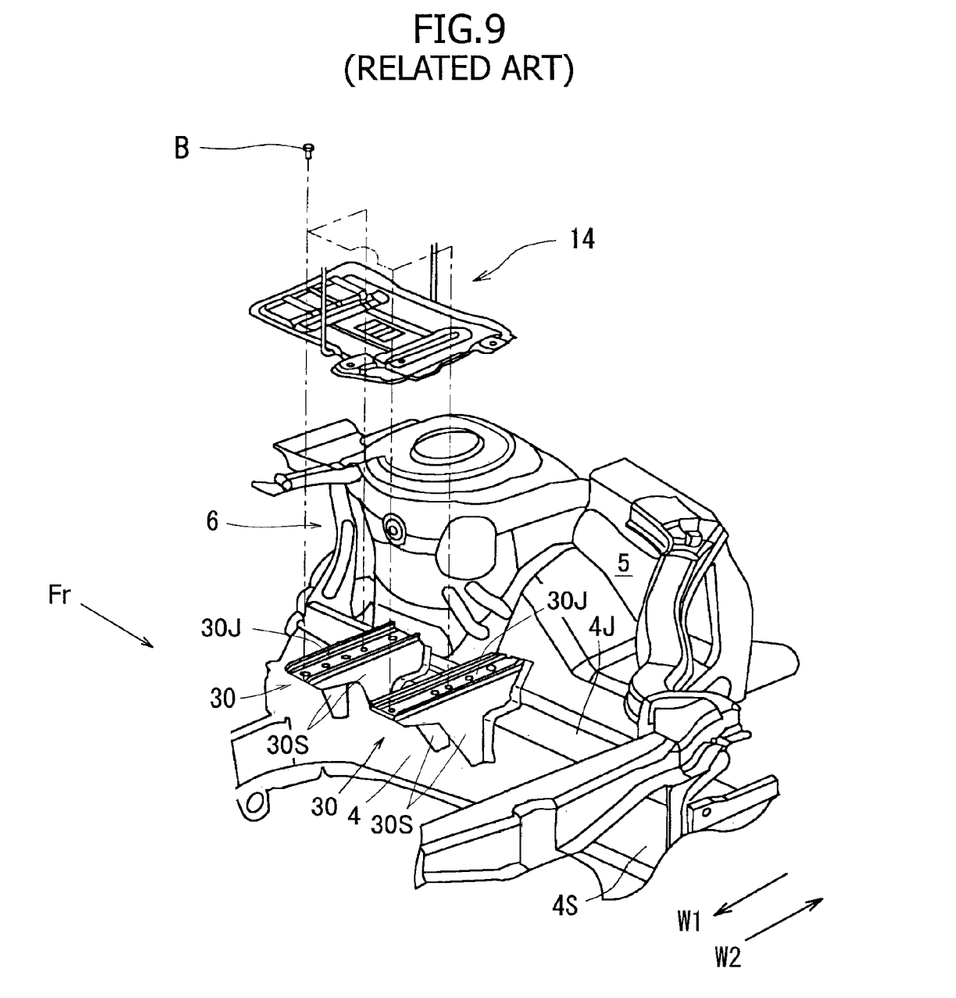
FIG. 9 is a perspective view of a conventional vehicle body front part structure.

Conventionally, in the vehicle body front part structure, as shown in FIG. 9, a pair of front and rear tray support stands 30 have been weldedly fixed to an apron side member 4 on the vehicle front side Fr of a strut tower part 6, and a tray 14 has been placed on the tray support stands 30 and fixed thereto by bolts B.

The tray support stand 30 is formed, as viewed from the side (viewed in the vehicle width direction), into a U shape in cross section, the lower side of which is open, and the lower end portion having an L shape in cross section of each of a pair of front and rear side walls 30S of the tray support stand 30 is weldedly fixed to an upper wall 4J of the apron side member 4 and a side wall 4S on the inside W1 in the vehicle width direction of the apron side member 4. Furthermore, the end portions on the outside W2 in the vehicle width direction of the pair of front and rear side walls 30S and the end portion on the outside W2 in the vehicle width direction of an upper wall 30J that connects the upper end portions of both of the side walls 30S are weldedly fixed to an apron side panel 5. (Refer to Patent Document 1 as a similar technique.)

Patent Document 1: JP 11-348689 A. To the joint portion between the apron side member and the apron side panel, a preservative sealer for inhibiting water from intruding between the joint surfaces of the joint portion is applied. Unfortunately, according to the above-described conventional structure, the sealer has been unable to be applied to a joint portion located on the outside in the vehicle width direction of the tray support stand (the joint portion between the pair of front and rear side walls 30S), so that water has intruded between the joint surfaces of the joint portion, and rust has sometimes formed.

Also, in the above-described vehicle body front part structure, the apron side member has been deformed easily at the time of frontal collision of vehicle. Therefore, a structure capable of absorbing impact energy with high efficiency has been desired.

SUMMARY OF THE INVENTION

The present invention has been made in view of the above circumstances, and accordingly, an object thereof is to provide a vehicle body front structure capable of preventing the formation of rust at the joint surfaces of a joint portion between an apron side member and an apron side panel by eliminating omission of sealer application at the joint portion, capable of absorbing impact energy with high efficiency at the time of vehicle collision, capable of improving the energy absorbing efficiency, capable of improving the shock absorbing performance, capable of optimizing the material qualities and plate thicknesses of the apron side member and the peripheral parts, and capable of reducing the weight and manufacturing cost.

In a first aspect of the present invention, a vehicle body front part structure in which an apron side panel is joined to an apron side member extending along the vehicle longitudinal direction; and a tray for battery is supported at the apron side member, in which a leg part is provided in an tray body part of the tray; a lower end part of the leg part is fixed to the apron side member with a fixing member; and the leg part is formed of a plate material so that the deformation of the apron side member is allowed when a vehicle longitudinal force is applied to the apron side member.

According to the above-described configuration, since the leg part is provided in the tray body part of the tray, and the lower end part of the leg part is fixed to the apron side member with the fixing member, in the case in which the sealer is applied to the joint portion between the apron side member and the apron side panel, the sealer can be applied before the lower end part of the leg part is fixed to the apron side member with the fixing member.

Therefore, the sealer can be applied to the joint portion in the state in which the tray does not become a hindrance, a place of no application of sealer (omission of sealer application) can be eliminated, and water can reliably be inhibited from intruding between the joint surfaces of the joint portion, so that rust can be prevented from being formed at the joint surfaces.

Since the leg part is formed of a plate material so that the deformation of the apron side member is allowed when a vehicle longitudinal force is applied to the apron side member, as compared with the conventional structure in which, when the vehicle collides frontally, that is, when a vehicle longitudinal force is applied to the apron side member, the pair of front and rear side walls 30S of the tray support stand 30 and the upper wall 30J that connects the upper end portions of both of the side walls 30S resist the force, for example, as shown in FIG. 9, the apron side member is deformed easily at the time of frontal collision, so that impact energy can be absorbed with high efficiency.

Thereby, the energy absorbing efficiency can be improved, and the shock absorbing performance can be improved. Also, the material qualities and plate thicknesses of the apron side member and the peripheral parts can be optimized, and the weight and manufacturing cost can be reduced.

In the first aspect of the invention, if the plate surface of the leg part is directed to the vehicle longitudinal direction, when a vehicle longitudinal force is applied at the apron side member, the leg part can be deformed easily in the vehicle longitudinal direction with respect to the apron side member. Thereby, the above-described effects due to the configuration of the first invention can be achieved more easily.

In a second aspect of the present invention, a vehicle body front part structure in which an apron side panel is joined to an apron side member extending along the vehicle longitudinal direction; and a tray for battery is supported at the apron side member, in which a leg part is provided in a tray body part of the tray; a lower end part of the leg part is fixed to the apron side member with a fixing member; and the leg part is formed by a plurality of vertically long members so that the deformation of the apron side member is allowed when a vehicle longitudinal force is applied to the apron side member.

According to the above-described configuration, since the leg part is provided in the tray body part of the tray, and the lower end part of the leg part is fixed to the apron side member with the fixing member, in the case in which the sealer is applied to the joint portion between the apron side member and the apron side panel, the sealer can be applied before the lower end part of the leg part is fixed to the apron side member with the fixing member.

Therefore, the sealer can be applied to the joint portion in the state in which the tray does not become a hindrance, a place of no application of sealer (omission of sealer application) can be eliminated, and water can reliably be inhibited from intruding between the joint surfaces of the joint portion, so that rust can be prevented from forming at the joint surfaces.

Since the leg part is formed of a plate material so that the deformation of the apron side member is allowed when a vehicle longitudinal force is applied at the apron side member, as compared with the conventional structure in which, when the vehicle collides frontally, that is, when a vehicle longitudinal force is applied at the apron side member, the pair of front and rear side walls 30S of the tray support stand 30 and the upper wall 30J that connects the upper end portions of both of the side walls 30S resist the force, for example, as shown in FIG. 9, the apron side member is deformed easily at the time of frontal collision, so that impact energy can be absorbed with high efficiency.

Thereby, the energy absorbing efficiency can be improved, and the shock absorbing performance can be improved. Also, the material qualities and plate thicknesses of the apron side member and the peripheral parts can be optimized, and the weight and manufacturing cost can be reduced.

In the first or second aspect of the present invention, if an engine mount interposed between an engine and the apron side member is connected to the apron side member, and the tray body part is fixed to the apron side panel with a fixing member, and the tray body part is placed on and fixed to the engine mount, the effects described below can be achieved.

Since the tray body part is fixed to the apron side panel with the fixing member, and the tray body part is placed on and fixed to the engine mount, the tray can be supported stably, and a burden imposed on the leg part can be eased, so that the leg part can be decreased in size. Also, the battery placed in the tray body part plays a role of a weight on the engine mount, so that vibrations of the engine mount can be restrained.

In the present invention, if a support part for supporting an accessory of an engine is provided in the tray body part, a space in the engine compartment can be utilized effectively.

In the present invention, if the support part is formed by a vertical wall rising from the peripheral portion of the tray; and the accessory is mounted on the vertical wall surface directed to the outside in the radial direction of the tray, since the accessory of engine is not located over the tray, the accessory of engine can be supported by the support part of the tray without a decrease in the accommodation capacity of the tray.

According to the present invention, there can be provided the vehicle body front part structure in which omission of sealer application to the joint portion between the apron side member and the apron side panel is eliminated, and thereby rust can be prevented from being formed at the joint surfaces of the joint portion, and moreover, impact energy can be absorbed with high efficiency at the time of vehicle collision, the energy absorbing efficiency can be improved, the shock absorbing performance can be improved, the material qualities and plate thicknesses of the apron side member and the peripheral parts can be optimized, and the weight and manufacturing cost can be reduced.

DETAILED DESCRIPTION OF PREFERRED EMBODIMENTS

Figure 1:
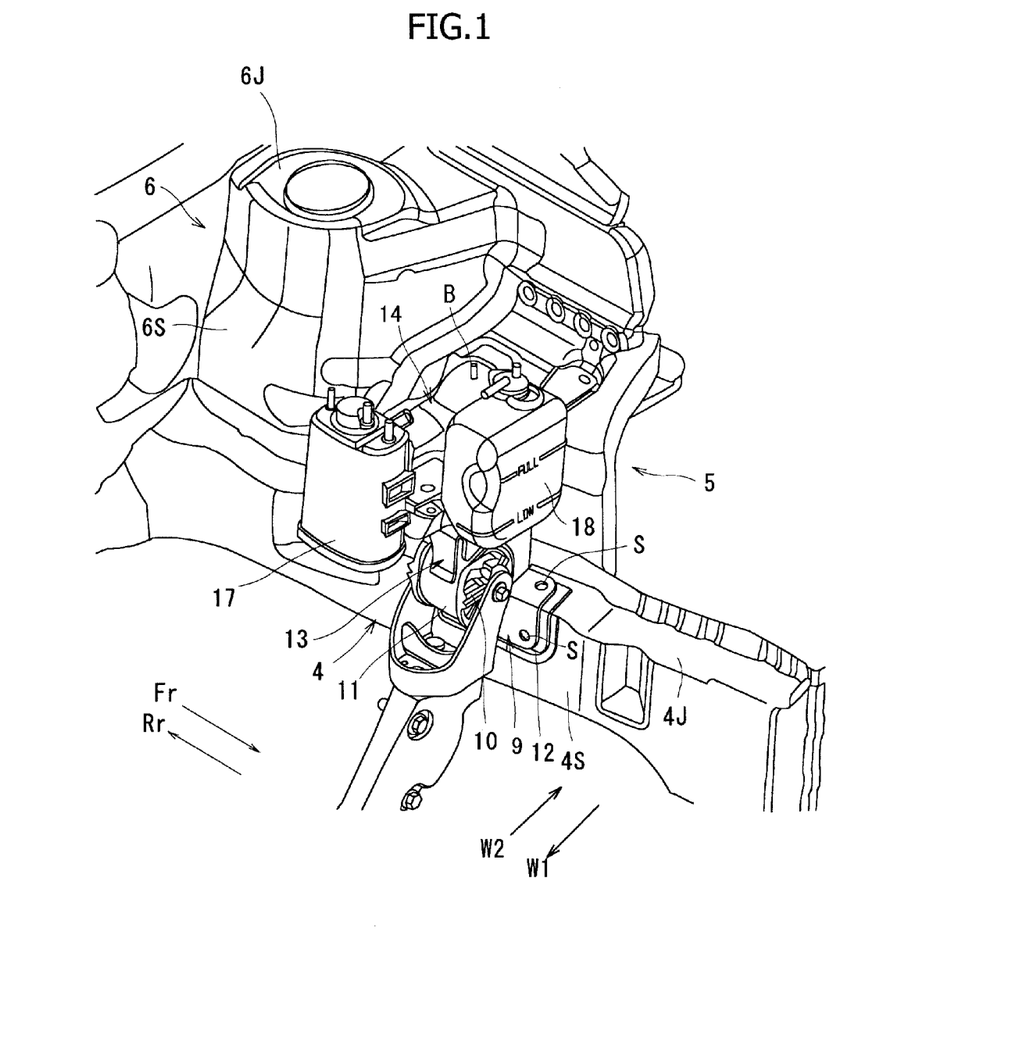
FIG. 1 is a perspective view of a vehicle body front part structure in a state in which a canister and a reservoir tank are mounted to a tray.
Figure 3A:
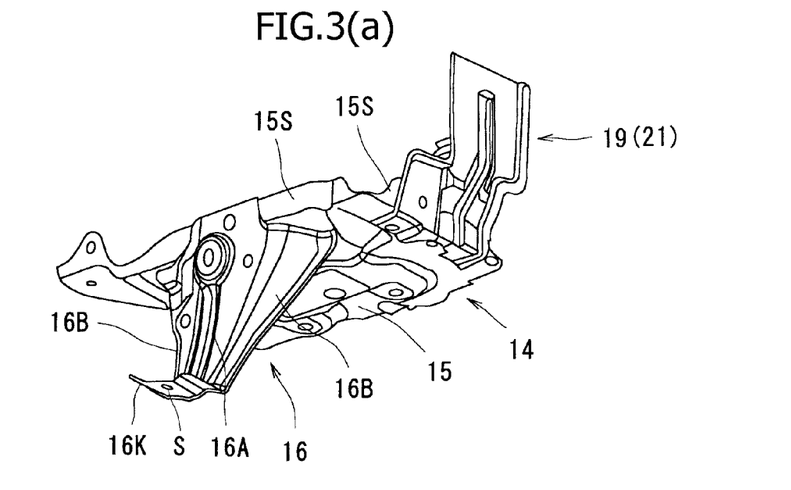
FIG. 3(a) is a perspective view of a tray.
Figure 3B:
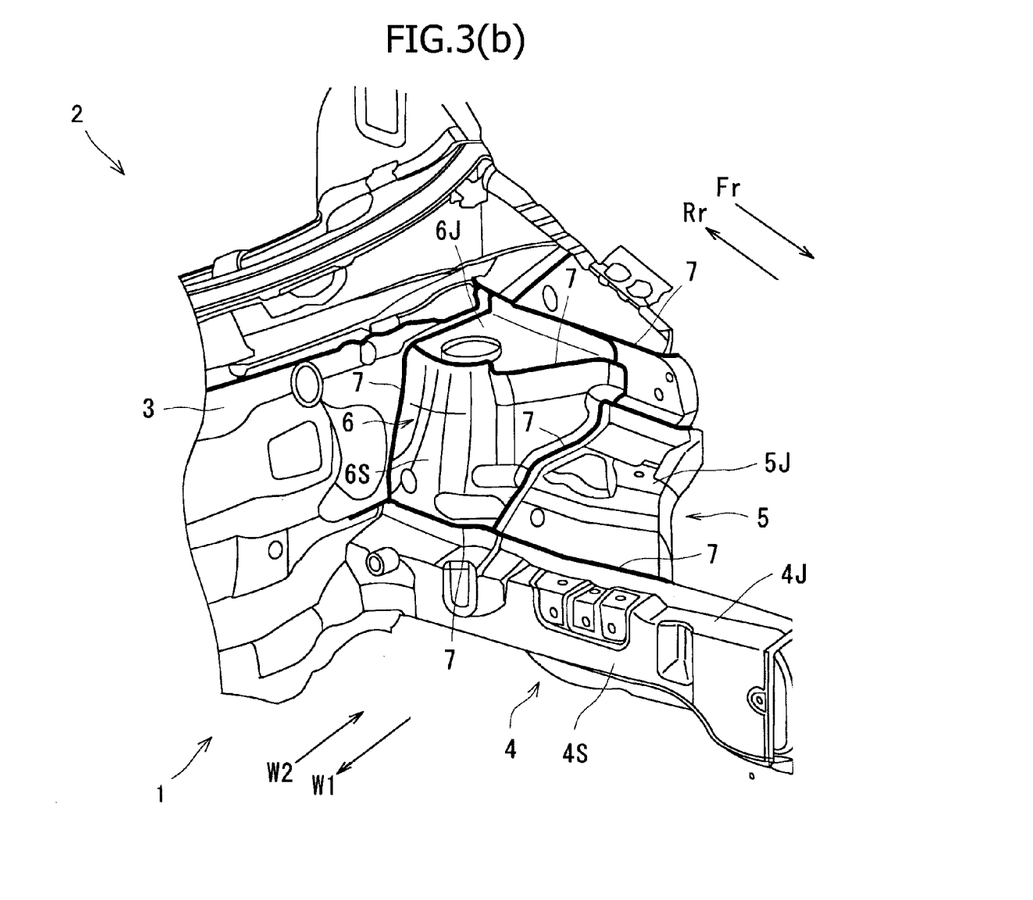
FIG. 3(b) is a perspective view of a vehicle body front part structure in a state before an engine mount and a tray are mounted.

FIG. 1 and FIGS. 3(a) and 3(b) show a vehicle body front part structure of a motor vehicle. This vehicle body front part structure includes a dash panel 3 partitioning a vehicle compartment 2 from an engine compartment 1, an apron side member 4 of a rectangular tubular shape extending in the vehicle longitudinal direction, an apron side panel 5, and a strut tower part 6 expanding from the apron side panel 5 into the engine compartment 1 on the inside W1 in the vehicle width direction.

The strut tower part 6 includes a peripheral wall 6S having a trapezoidal transverse cross section narrowing toward the inside W1 in the vehicle width direction, and an upper wall 6J connected to the upper end portion of the peripheral wall 6S, and incorporates a suspension strut for a front wheel. The corner portion of the peripheral wall 6S in the transverse cross section is curved in an arc shape. The apron side panel 5 is joined by welding to the apron side member 4, and a part thereof projects to the vehicle front side Fr of the lower half portion of the strut tower part 6.

As shown in FIG. 3(b), the upper wall 6J of the strut tower part 6 and the upper end portion of the peripheral wall 6S are joined by welding to each other, of the walls of the strut tower part 6, the lower end portion on the inside W1 in the vehicle width direction of the peripheral wall 6S is joined by welding to the end portion on the outside W2 in the vehicle width direction of an upper wall 4J of the apron side member 4, the portion on the outside W2 in the vehicle width direction and the lower end portion on the vehicle front side Fr of the peripheral wall 6S are joined by welding to the apron side panel 5, and the portion on the vehicle rear side Rr of the peripheral wall 6S is joined by welding to the dash panel 3. A preservative sealer 7 is applied to these joined by welding portions to inhibit water from intruding between the mating surfaces (joint surfaces) of the joined by welding portions.

Figure 4:
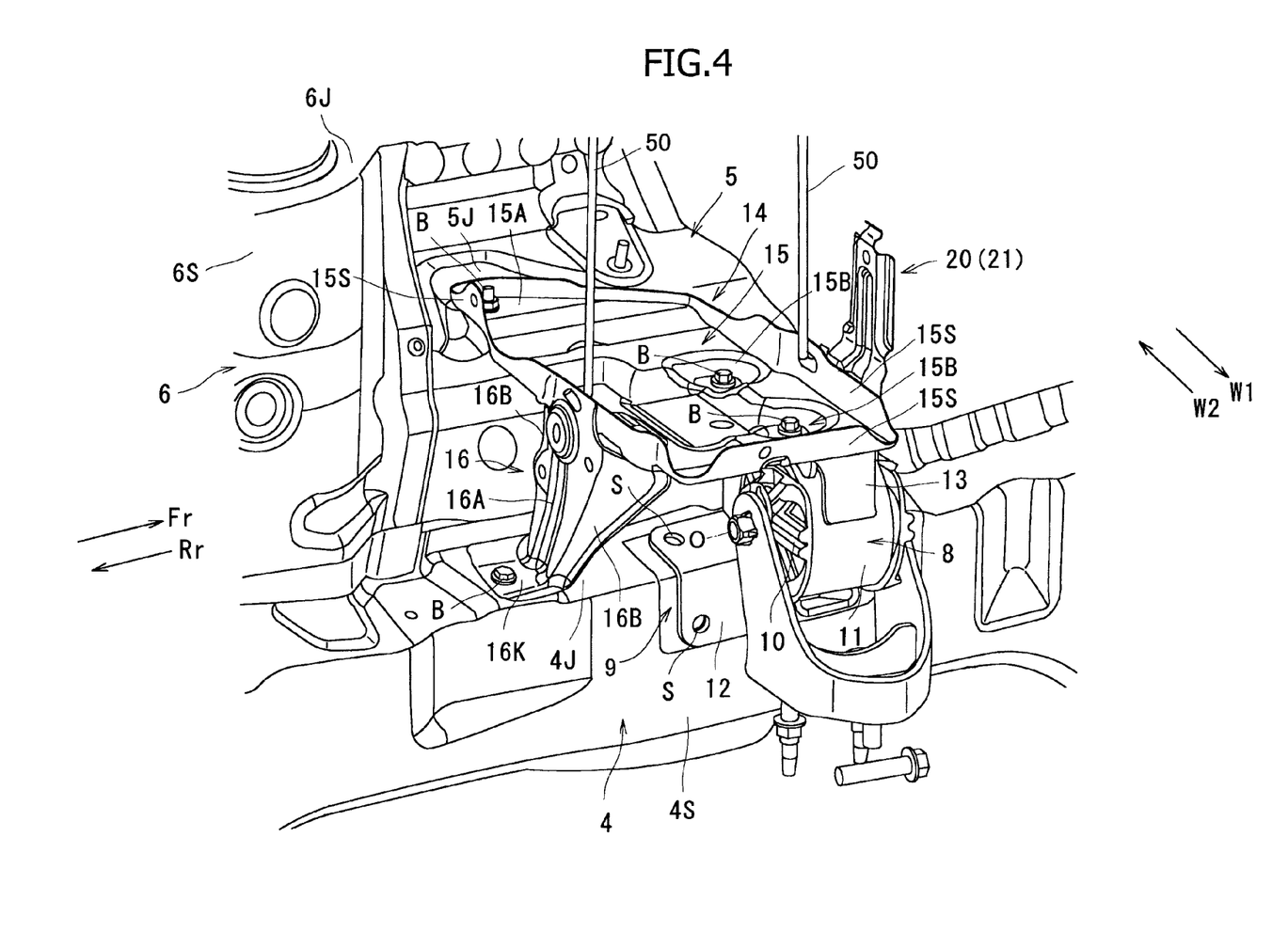
FIG. 4 is a perspective view of a vehicle body front part structure.
Figure 5:
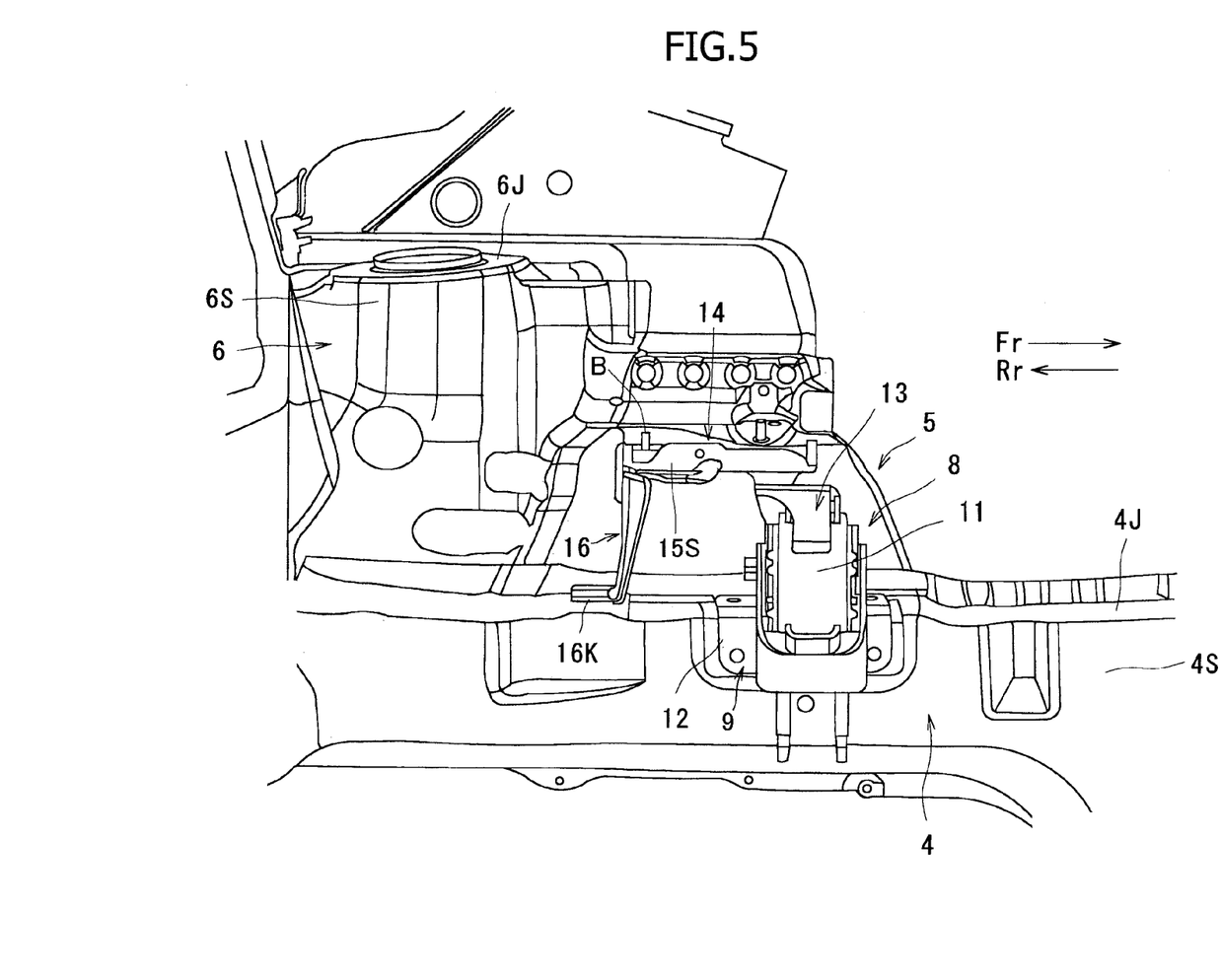
FIG. 5 is a side view of a vehicle body front part structure viewed from the center side in the vehicle width direction.

As also shown in FIGS. 4 and 5, an engine mount 8 is fixed to the apron side member 4 on the vehicle front side Fr of the strut tower part 6 via an engine mount bracket 9 (refer to FIG. 2) with bolts B, and projects to the inside W1 in the vehicle width direction. Thus, the engine mount 8 interposed between the engine and the apron side member 4 is connected to the apron side member 4. This engine mount 8 absorbs the vibrations of the engine.

Figure 2:
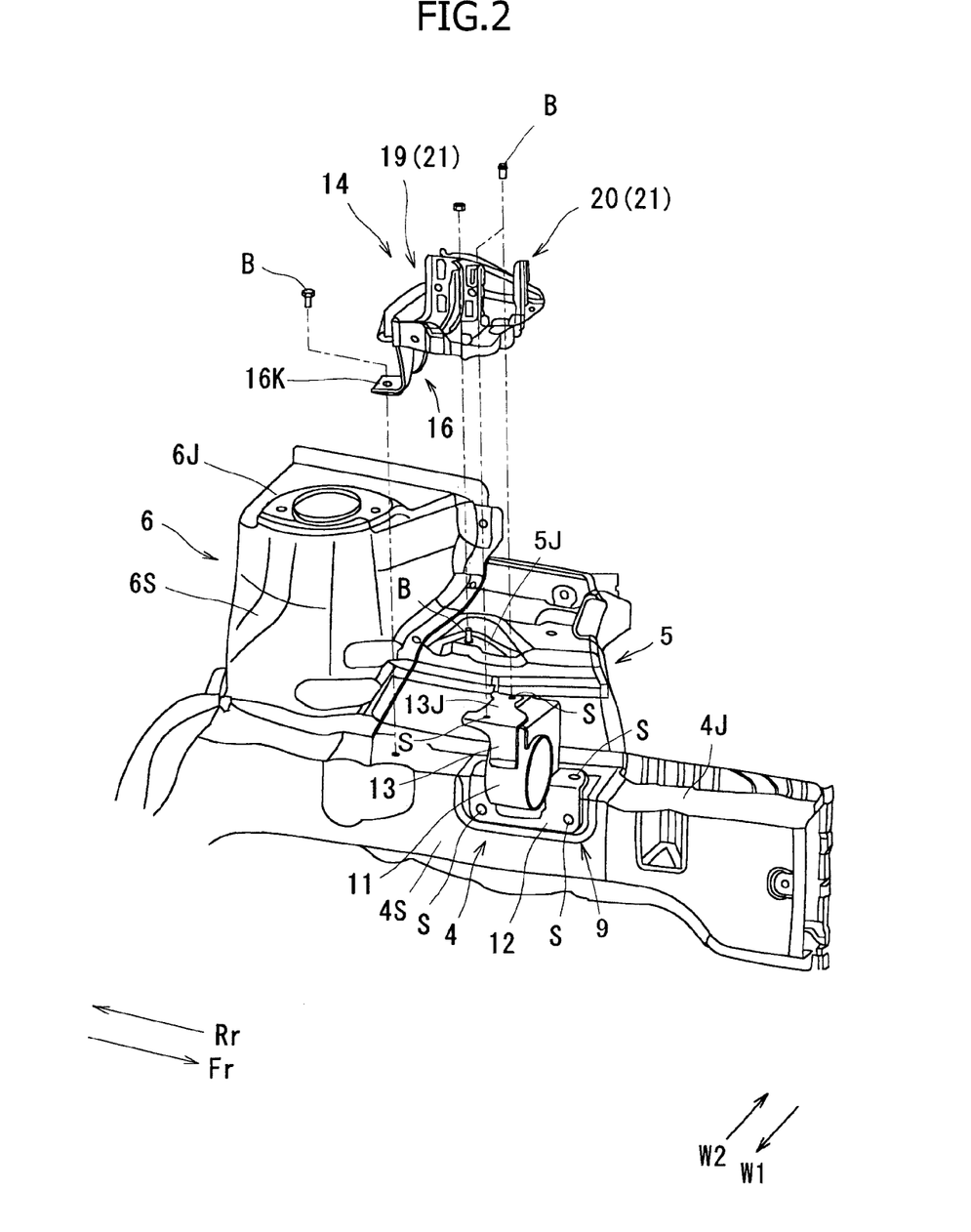
FIG. 2 is a perspective view of a vehicle body front part structure in a state before a tray is mounted.

The engine mount 8 consists of an inner cylinder, an outer cylinder, and a rubber-form elastic body 10 connecting the inner cylinder and the outer cylinder to each other. As shown in FIG. 2, the engine mount bracket 9 consists of a cylindrical part 11, a lower connecting member 12 having an L-shaped cross section weldedly fixed to the lower outer peripheral portion of the cylindrical part 11, and a pedestal-shaped upper connecting member 13 weldedly fixed to the upper outer peripheral portion of the cylindrical part 11. The lower connecting member 12 and the upper connecting member 13 each are formed with a plurality of bolt insertion holes S. The upper connecting member 13 is formed by joining upper pieces of a pair of L-shaped members to each other.

The engine mount 8 is press fitted in the cylindrical part 11 of the engine mount bracket 9, and both pieces of the lower connecting member 12 are fixed individually to the side wall 4S and the upper wall 4J with bolts B so that the axes O (refer to FIG. 4) of the inner and outer cylinders extend along the vehicle longitudinal direction.

Also, as shown in FIGS. 2 and 4, the tray 14 for a battery is fixed, with bolts B, to an upper wall 5J of the apron side panel 5, which is located on the vehicle front side Fr of the strut tower part 6, the upper wall 4J of the apron side member 4, which is located on the vehicle front side Fr of the strut tower part 6, and an upper wall 13J of the upper connecting member 13 of the engine mount bracket 9.

Structure of Tray 14

As shown in FIG. 4, a tray body part 15 of the tray 14 is formed so as to be long in the vehicle width direction, and a short peripheral wall 15S rises from the peripheral portion of the tray body part 15. A battery is placed on and fixed to the tray body part 15. To the end portion on the vehicle rear side Rr of the tray body part 15, the upper end portion of a leg part 16 is weldedly fixed. The leg part 16 is formed of a plate material so that the deformation of the apron side member 4 is allowed when the motor vehicle collides frontally and a vehicle longitudinal force is applied to the apron side member 4.

Describing in more detail, the leg part 16 is formed of one metallic plate the plate surface of which is directed to the vehicle longitudinal direction, and is formed so as to be wider toward the upside. Both end parts 16B in the width direction of the leg part 16 are bent to the vehicle front side Fr with respect to a central part 16A in the width direction of the leg part 16. That is, the leg part 16 is formed into a mountain shape that is convex to the vehicle rear side Rr in transverse cross section.

The central part 16A in the width direction of the upper end portion of the leg part 16 projects upward, and is weldedly fixed to the outside surface of the peripheral wall 15S of the tray body part 15 by being lapped on the peripheral wall 15S from the vehicle front side Fr. Also, both the end parts 16B in the width direction of the upper end portion of the leg part 16 are weldedly fixed to the lower surface of the peripheral portion of the tray body part 15 from the downside.

Thereby, the upper end portion of the leg part 16 can be fixed firmly to the tray body part 15, and the tray body part 15 can be supported stably by the leg part 16. Also, since the leg part 16 is formed into a mountain shape in the transverse cross section, the rigidity of the leg part 16 can be improved. A lower end part 16K of the leg part 16 is bent to the vehicle rear side Rr.

A mounting part 15A on the outside W2 in the vehicle width direction of the tray body part 15 is fixed to the upper wall 5J of the apron side panel 5 with a bolt B (corresponding to a fixing member), and a pair of mounting parts 15B on the inside W1 in the vehicle width direction of the tray body part 15 are fixed to the upper wall 13J (refer to FIG. 3) of the upper connecting member 13 of the engine mount bracket 9 with bolts B (corresponding to fixing members).

Also, the bent lower end part 16K of the leg part 16 of the tray 14 is fixed to the upper wall 4J of the apron side member 4 with a bolt B (corresponding to a fixing member).

As shown in FIG. 5, the leg part 16 tilts so that the upside thereof is located on the vehicle front side Fr. Thereby, the leg part 16 can support the tray body part 15 stably. Also, as shown in FIG. 4, the pair of mounting parts 15B on the inside W1 in the vehicle width direction of the tray body part 15 are located with a space being provided therebetween, and they expand in a pedestal shape to the downside.

As described above, the tray body part 15 is placed on and fixed to the engine mount 8. The bolt B that connects the mounting part 15A on the outside W2 in the vehicle width direction of the tray body part 15 to the upper wall 5J of the apron side panel 5 is weldedly fixed to the upper wall 5J of the apron side panel 5 and projects upward (refer to FIG. 2). A pair of bars extending along the up-and-down direction, which are denoted by reference numeral 50 in FIG. 4, play a role in fixing the battery.

Support Structure for Canister 17 and Reservoir Tank 18

Figure 6:
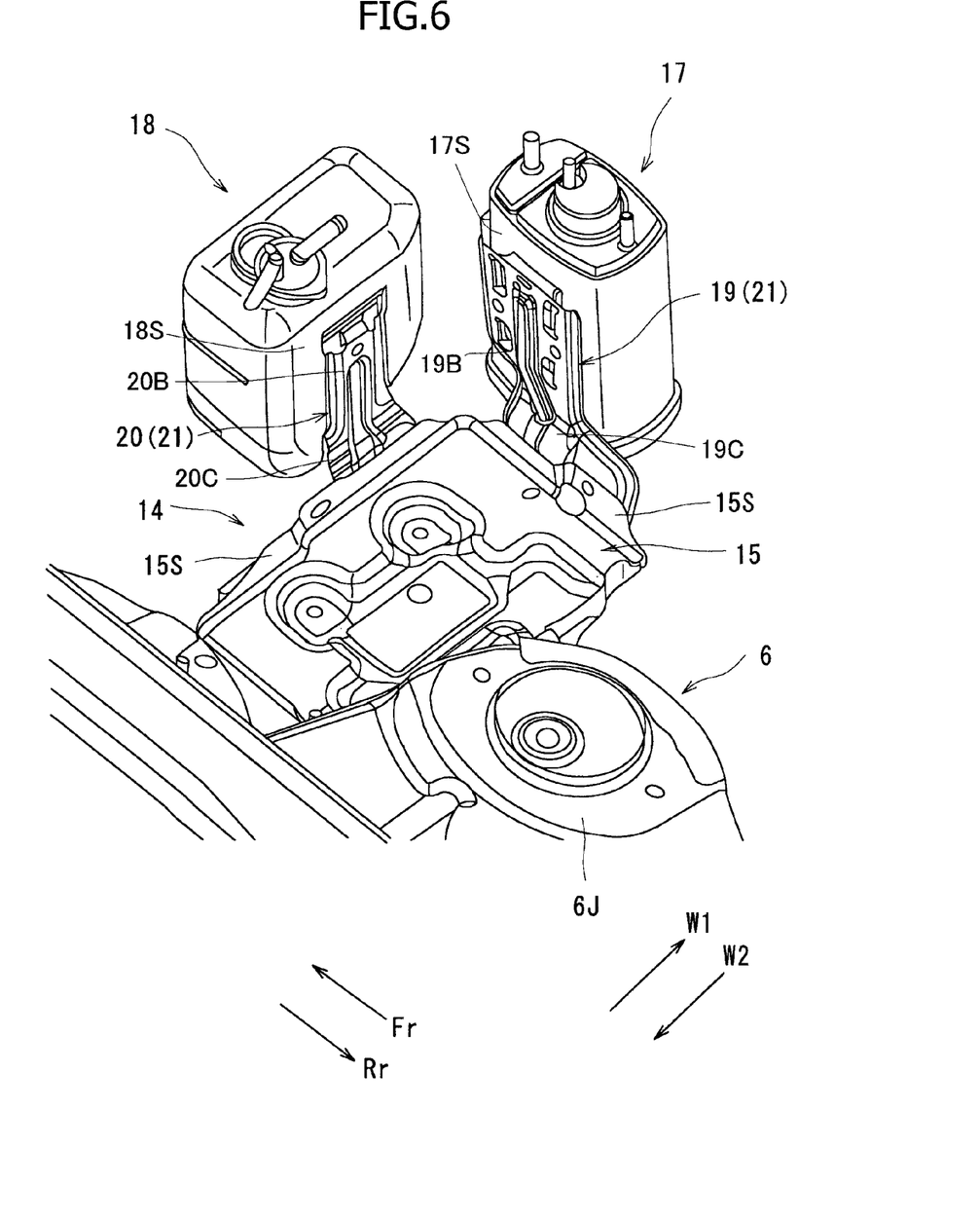
FIG. 6 is a perspective view showing a structure for mounting a canister and a reservoir tank to a tray.
Figure 7:
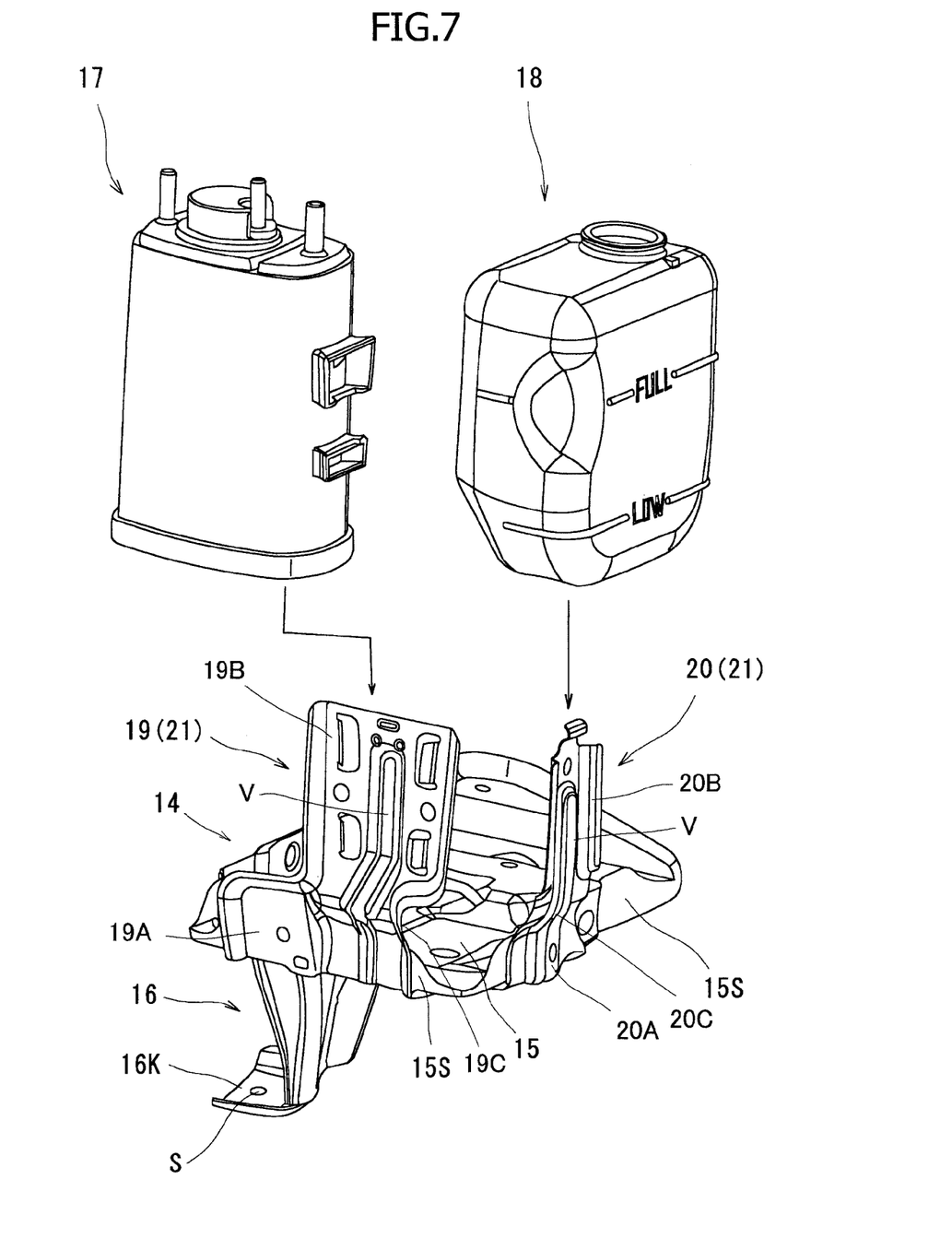
FIG. 7 is an exploded perspective view of a structure for mounting a canister and a reservoir tank to a tray.

As shown in FIGS. 1, 6 and 7, a support part 21 for supporting a canister 17 (corresponding to an accessory of the engine) and a reservoir tank 18 (corresponding to an accessory of the engine) is provided individually in the tray body part 15. The support part 21 is formed by an inside vertical wall 19 rising from a peripheral wall portion on the inside W1 in the vehicle width direction of the peripheral wall 15S of the tray body part 15 and a front-side vertical wall 20 rising from a peripheral wall portion on the vehicle front side Fr, and the lower end portion of the inside vertical wall 19 and the lower end portion of the front-side vertical wall 20 are fixed to the peripheral wall 15S of the tray body part 15.

The canister 17 is mounted on the vertical wall surface of the inside vertical wall 19 directed to the inside W1 in the vehicle width direction of the outsides in the radial direction of the tray 14, and the reservoir tank 18 is mounted on the vertical wall surface of the front-side vertical wall 20 directed to the vehicle front side Fr of the outsides in the radial direction of the tray 14.

The canister 17 stores evaporating gas supplied from a fuel tank, the evaporating gas being circulated to the air intake system of engine and burnt when the engine is operated. The reservoir tank 18 stores cooling water for the engine to regulate the pressure in a cooling path according to a change in cooling water temperature. The canister 17 and the reservoir tank 18 have approximately the same capacity.

Structure of Inside Vertical Wall 19

The inside vertical wall 19 includes a first mounting surface part 19A having an L-shaped cross section weldedly fixed to the peripheral wall 15S and the lower surface of the tray body part 15, and a second mounting surface part 19B assuming a vertical posture to which a side wall 17S of the canister 17 is boldly fixed. The first mounting surface part 19A and the second mounting surface part 19B are each formed with a reinforcing bead V.

The first mounting surface part 19A is formed so as to be wider than the second mounting surface part 19B, and the second mounting surface part 19B rises from a portion on the vehicle front side Fr of the first mounting surface part 19A. Also, the second mounting surface part 19B connects with the first mounting surface part 19A via a step part 19C, and is located outside the first mounting surface part 19A in the radial direction of tray 14. Thereby, the battery can be preventing from interfering with the second mounting surface part 19B.

Structure of Front-Side Vertical Wall 20

The front-side vertical wall 20 includes a third mounting surface part 20A having an L-shaped cross section fixed by welding to the peripheral wall 15S of the tray body part 15, and a fourth mounting surface part 20B assuming a vertical posture to which a side wall 18S of the reservoir tank 18 is fixed by bolting. The third mounting surface part 20A and the fourth mounting surface part 20B each are formed with a reinforcing bead V.

The third mounting surface part 20A is formed so as to be wider than the fourth mounting surface part 20B. Also, the fourth mounting surface part 20B connects with the third mounting surface part 20A via a trapezoidal step part 20C, and is located outside the third mounting surface part 20A in the radial direction of tray 14. Thereby, the battery can be preventing from interfering with the fourth mounting surface part 20B.

As shown in FIG. 3(b), the sealer 7 is applied to the weldedly joined portions before the tray 14 (refer to FIG. 2) and the engine mount bracket 9 are fixed to the apron side member 4 and the like. Therefore, when the sealer 7 is applied, the tray 14 and the engine mount bracket 9 do not become a hindrance, so that no application of sealer can be avoided. Thereby, water can be inhibited from intruding between the joint surfaces of the joined by welding portions (the mating surfaces of the joint portions), so that rust can reliably be prevented from being formed on the mating surfaces.

As described above, the leg part 16 is formed of a plate material so that the deformation of the apron side member 4 is allowed when a vehicle longitudinal force is applied to the apron side member 4. Therefore, as compared with the conventional structure in which, when the vehicle collides frontally, that is, when a vehicle longitudinal force is applied to the apron side member 4, the pair of front and rear side walls 30S of the tray support stand 30 and the upper wall 30J that connects the upper end portions of both of the side walls 30S resist the force, for example, as shown in FIG. 9, the apron side member 4 is deformed easily at the time of frontal collision, so that impact energy can be absorbed with high efficiency.

Figure 8:
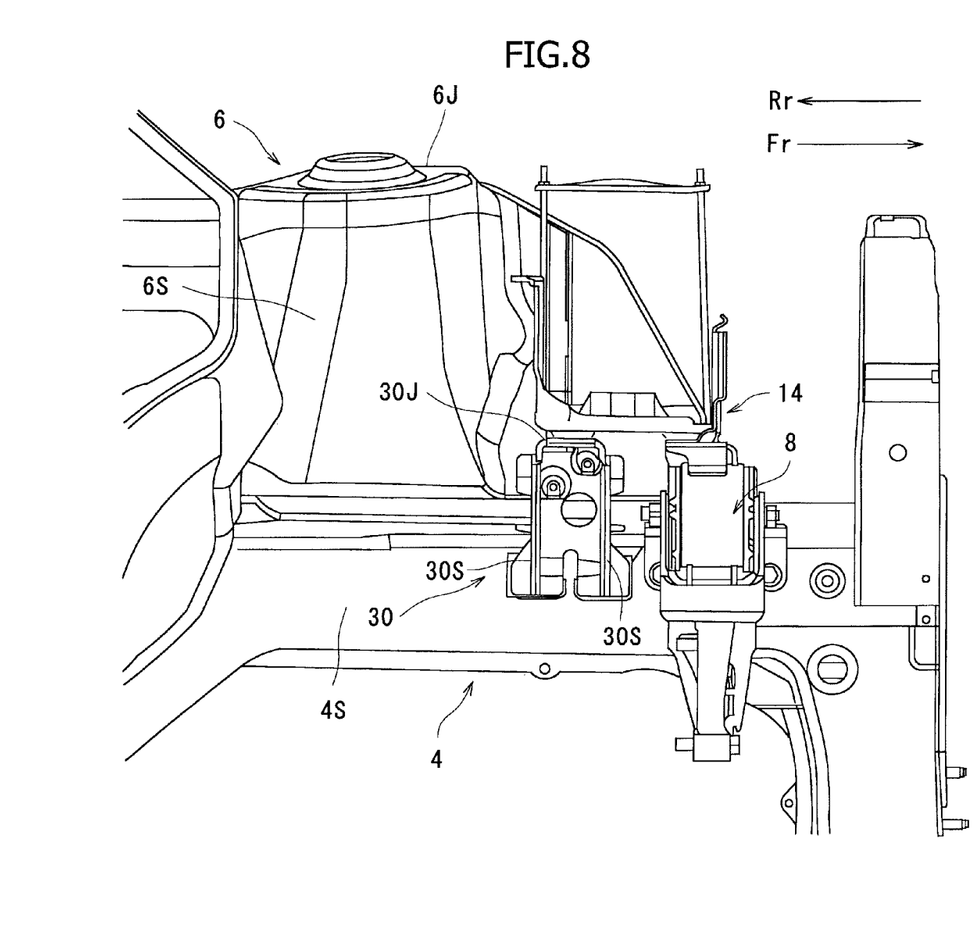
FIG. 8 is a side view of comparative example, showing a vehicle body front part structure viewed from the center side in the vehicle width direction.

Also, as shown in FIG. 8 showing the structure of a comparative example, in the case of a structure in which the tray support stand 30 is formed, as viewed from the side (viewed in the vehicle width direction), into a U shape in cross section the lower side of which is open is provided in place of the leg part 16 of the present invention, as well, when the vehicle collides frontally, that is, when a vehicle longitudinal force is applied to the apron side member 4, the pair of front and rear side walls 30S of the tray support stand 30 and the upper wall 30J that connects the upper end portions of both of the side walls 30S resist the force. For the configuration of the present invention, however, such a problem does not occur. The apron side member 4 is deformed easily at the time of frontal collision, so that impact energy can be absorbed with high efficiency.

Thereby, the energy absorbing efficiency can be improved, and the shock absorbing performance can be improved. Also, the material qualities and plate thicknesses of the apron side member 4 and the peripheral parts can be optimized, and the weight and manufacturing cost can be reduced.

Various Modifications (1) Although not shown in the figures, the configuration may be such that the tray body part 15 is provided with the leg part 16 consisting of a plurality of vertically long members (such as band-shaped members or rod-shaped members), and the lower end portions of the plurality of vertically long members are fixed to the apron side member 4 with bolts serving as fixing members.

(2) The leg part 16 may be connectingly fixed to the tray body part 15 by a means other than the weld fixing means.

(3) The lower end part 16K of the leg part 16 may be fixed to the apron side member 4 with a fixing member other than the bolt.

(4) The tray 14 need not be placed on and fixed to the engine mount 8.

(5) The present invention can be applied to a structure for mounting not only the battery tray but also any other equipment.

The invention claimed is:

1. A vehicle body front part structure comprising:
an apron side panel, the apron side panel joined by welding to an apron side member extending along a longitudinal direction of the vehicle, the vehicle having a vehicle front side and a vehicle rear side spaced apart from the vehicle front side in the longitudinal direction; and
a tray for a battery, the tray supported on the apron side member, the tray having a tray body part and a leg part, the leg part having a lower end part and an upper end part wider than the lower end part, the lower end part of the leg part fixed to the apron side member by a fixing member, the upper end part of the leg part fixed to the tray body part, the leg part formed of one metallic plate so that deformation of the apron side member is allowed when a force in the longitudinal direction of the vehicle is applied to the apron side member,
wherein a plate surface of the leg part is directed along the longitudinal direction of the vehicle,
wherein the leg part has two lateral end parts at opposite sides of the leg part and a central part located between the lateral end parts, each lateral end part extending in a direction between the upper end part of the leg part and the lower end part of the leg part, and
wherein the leg part defines a transverse cross section in a width direction perpendicular to the longitudinal direction, and the leg part is formed into a mountain shape that is convex to the vehicle rear side in the transverse cross section, such that in the transverse cross section, both of the lateral end parts of the leg part are bent toward the vehicle front side with respect to the central part of the leg part.

2. The vehicle body front part structure according to claim 1, wherein
an engine mount interposed between an engine and the apron side member is connected to the apron side member, and the tray body part is fixed to the apron side panel with a fixing member; and
the tray body part is placed on and fixed to the engine mount.

3. The vehicle body front part structure according to claim 1, wherein a support part for supporting an accessory of an engine is provided in the tray body part.

4. The vehicle body front part structure according to claim 3, wherein
the support part is formed by a vertical wall rising from a peripheral portion of the tray; and
the accessory is mounted on a surface of the vertical wall directed outwardly along a radial direction of the tray.

5. A vehicle body front part structure comprising:
an apron side panel, the apron side panel joined by welding to an apron side member extending along a longitudinal direction of the vehicle, the vehicle having a vehicle front side and a vehicle rear side spaced apart from the vehicle front side in the longitudinal direction; and a tray for a battery, the tray supported on the apron side member, the tray having a leg part, the tray having a tray body part, the leg part provided at the tray body part, the leg part having a lower end part and an upper end part wider than the lower end part, the lower end part of the leg part fixed to the apron side member with a fixing member, the upper end part of the leg part fixed to the tray body part, the leg part formed of multiple vertically long members so that the deformation of the apron side member is allowed when a force in the longitudinal direction of the vehicle is applied to the apron side member, wherein the leg part has two lateral end parts at opposite sides of the leg part and a central part located between the lateral end parts, each lateral end part extending in a direction between the upper end part of the leg part and the lower end part of the leg part, and wherein the leg part defines a transverse cross section in a width direction perpendicular to the longitudinal direction, and the leg part is formed into a mountain shape that is convex to the vehicle rear side in the transverse cross section, such that in the transverse cross section, both of the lateral end parts of the leg part are bent toward the vehicle front side with respect to the central part of the leg part.

6. The vehicle body front part structure according to claim 5, wherein an engine mount interposed between an engine and the apron side member is connected to the apron side member, and the tray body part is fixed to the apron side panel with a fixing member; and the tray body part is placed on and fixed to the engine mount.

7. The vehicle body front part structure according to claim 5, wherein a support part for supporting an accessory of an engine is provided in the tray body part.

8. The vehicle body front part structure according to claim 7, wherein the support part is formed by a vertical wall rising from a peripheral portion of the tray; and the accessory is mounted on a surface of the vertical wall directed outwardly along a radial direction of the tray.

* * * * *